US 9,477,083 B2

(12) United States Patent
Weindorf et al.

(10) Patent No.: US 9,477,083 B2
(45) Date of Patent: Oct. 25, 2016

(54) ADJUSTING AN ELECTRONIC DISPLAY BASED ON LIGHT SENSING

(71) Applicants: Paul Fredrick Luther Weindorf, Novi, MI (US); James Joseph Kornacki, Dearborn, MI (US)

(72) Inventors: Paul Fredrick Luther Weindorf, Novi, MI (US); James Joseph Kornacki, Dearborn, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/556,903

(22) Filed: Dec. 1, 2014

(65) Prior Publication Data

US 2016/0157324 A1    Jun. 2, 2016

(51) Int. Cl.
| | | |
|---|---|---|
| *B60Q 1/14* | (2006.01) | |
| *G02B 27/01* | (2006.01) | |
| *B60Q 3/02* | (2006.01) | |
| *B60Q 3/04* | (2006.01) | |
| *H05B 37/02* | (2006.01) | |

(52) U.S. Cl.
CPC ......... *G02B 27/0101* (2013.01); *B60Q 3/0293* (2013.01); *B60Q 3/048* (2013.01); *H05B 37/0218* (2013.01); *G02B 2027/0118* (2013.01)

(58) Field of Classification Search
CPC .... B60Q 3/048; B60Q 3/0293; B60Q 3/001; B60Q 1/1423; B60Q 1/26; B60Q 1/14; B60K 2350/2069; B60K 2350/2078; B60K 2350/352
USPC ................. 315/76–84, 149–158, 185 R, 291
See application file for complete search history.

(56) References Cited

U.S. PATENT DOCUMENTS

| | | | |
|---|---|---|---|
| 5,883,605 A | 3/1999 | Knapp | |
| 6,479,810 B1 | 11/2002 | Weindorf | |
| 6,483,245 B1 | 11/2002 | Weindorf et al. | |
| 6,507,286 B2 | 1/2003 | Weindorf et al. | |
| 6,762,741 B2 | 7/2004 | Weindorf | |
| 8,358,074 B2* | 1/2013 | Biondo | B60Q 1/085 315/82 |
| 2002/0101166 A1* | 8/2002 | Weindorf | B60Q 3/048 315/82 |
| 2002/0118182 A1* | 8/2002 | Weindorf | G09G 3/20 345/204 |
| 2004/0201483 A1* | 10/2004 | Stam | B60Q 1/1423 340/600 |
| 2012/0327051 A1* | 12/2012 | Davies | G09G 5/10 345/207 |

FOREIGN PATENT DOCUMENTS

| | | |
|---|---|---|
| WO | 2013/167466 A2 | 11/2013 |
| WO | 2013/167466 A3 | 11/2013 |

OTHER PUBLICATIONS

Silverstein et al., "The Development and Evaluation of Color Systems for Airborne Applications-Fundamental Visual, Perceptual, and Display Systems Considerations," SAE International, Oct. 14, 1985, pp. 301-305, Paper Q No. 851774.*

(Continued)

*Primary Examiner* — Haissa Philogene
*Assistant Examiner* — Borna Alaeddini
(74) *Attorney, Agent, or Firm* — Dickinson Wright PLLC (57) ABSTRACT

A system for adjusting an electronic display is provided herein. The system includes a forward looking light sensor receiver to logarithmically receive a first light information from a forward looking light sensor; an ambient light sensor receiver to logarithmically receive a second light information from an ambient light sensor; and an adjuster to adjust a luminance of the electronic display based on a combination of the first light information and the second light information.

9 Claims, 9 Drawing Sheets

(56) References Cited

OTHER PUBLICATIONS

"Standard Metrology for Vehicular Displays" SAE International, Jul. 2002, Revised Apr. 2007, pp. 1-27, J1757-1, Available online at www.cie.co.at.

"Road vehicles- Ergonomic aspects of transport information and control systems- Specifications and test procedures for in-vehicle visual presentation" International Standard, Feb. 15, 2009 (second edition), pp. 1-18, ISO 15008 (Ref. No. ISO 15008:2009(E)), Switzerland.

"Ergonomic requirements for work with visual displays based on flat-panels- Part 2: Ergonomics requirements for flat panel displays," International Standard, Dec. 1, 2001(first edition), pp. 1-148. ISO 13406-2 (Ref. No. ISO 13406-2:2001(E)), Switzerland.

Silverstein et al., "The Development and Evaluation of Color Systems for Airborne Applications-Fundamental Visual, Perceptual, and Display Systems Considerations," SAE International, Oct. 14, 1985, pp. 241-365, Paper No. 851774.

IDMS Download Page,' The Society for Information Display (SID), Mar. 31, 2015, pp. 1-3, available online at http://www.sid.org/Publications/ICDM/oldIDMSLicenseamp;Download.aspx.

\* cited by examiner

| GF | ΔN |
|---|---|
| 0.027973 | -10 |
| 0.04 | -9 |
| 0.057199 | -8 |
| 0.081792 | -7 |
| 0.116961 | -6 |
| 0.16725 | -5 |
| 0.239163 | -4 |
| 0.341995 | -3 |
| 0.489043 | -2 |
| 0.699316 | -1 |
| 1 | 0 |
| 1.429969 | 1 |
| 2.044812 | 2 |
| 2.924018 | 3 |
| 4.181255 | 4 |
| 5.979066 | 5 |
| 8.54988 | 6 |
| 12.22606 | 7 |
| 17.48289 | 8 |
| 25 | 9 |
| 35.74923 | 10 |

ADJUSTING AN ELECTRONIC DISPLAY BASED ON LIGHT SENSING

CROSS-REFERENCE TO RELATED APPLICATION

This application is related to U.S. patent application Ser. No. 14/557,036, filed on Dec. 1, 2014, which is assigned to the same assignee as the current application, and all of which are incorporated by reference in its entirety as if fully set forth herein.

BACKGROUND

Electronic displays facilitate the reproduction of data on a lighted platform. Driving circuitry is employed to manipulate lighted elements to render the information being displayed. The viewer may gaze upon the display and view the lighted elements to process and consume the information.

However, because light is employed to convey the electronic information, the viewing experience is affected by the environment in which the electronic display is implemented in. For example, if the electronic display is an awkward or inconvenient location, viewing the electronic display may be ultimately frustrated.

Further, the environment around the electronic display may be dynamic and changing. For example, if the electronic display is implemented in an area that interacts with outside or external light providing sources, the electronic display's ability to convey information via the lighted elements may be obstructed or modified.

A measure of unit for determining the intensity of light being transmitted or propagated in a specific direction is known as luminance. Various units may be employed to measure luminance, such as a candela per square meter. One of ordinary skill in the art may appreciate that several units or types of measurements may be employed for luminance measurement.

For example, if an electronic display is implemented in a vehicle, the electronic display may interact with the outside lighting environment. Thus, several factors may be present with the exterior lighting to affect the display's ability to provide a clear display in an optimal fashion. For example, the exterior lighting may be affected by the cloud cover, the weather, the road (e.g. if the vehicle is in a tunnel), the time of day, or the like.

Thus, an electronic display may be aided greatly by an ability to be cognizant of the exterior lighting conditions. Based on the knowledge of the exterior lighting conditions, the electronic display may adjust the display luminance accordingly.

Figure 1:
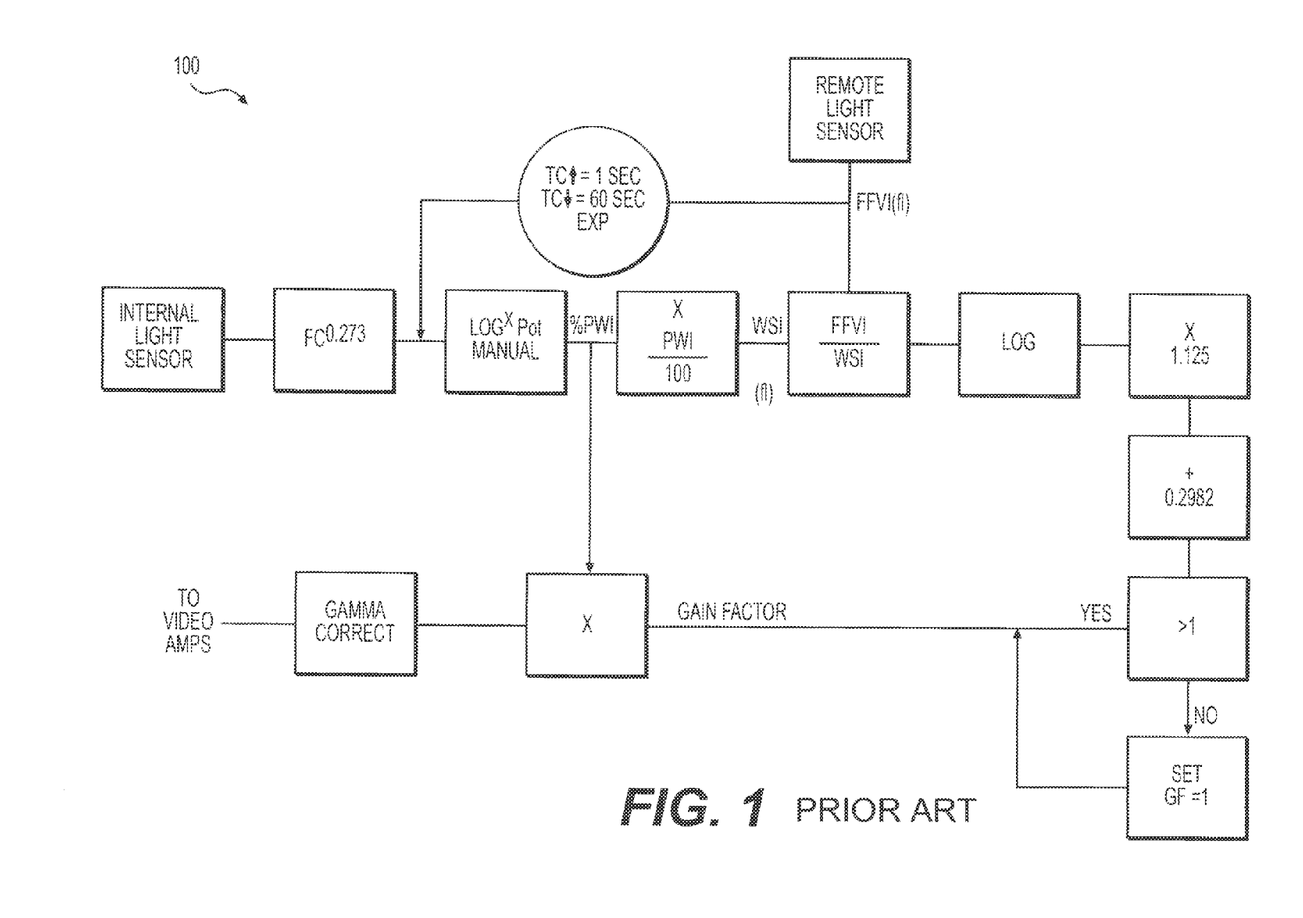
FIG. 1 illustrates an example of a system for adjusting display luminance according to a conventional implementation.

One such example of a system for adjusting display luminance is shown in FIG. 1. FIG. 1 illustrates an example of a system 100 for adjusting display luminance according to a conventional implementation. Because the system 100 is known in the prior art, a detailed explanation will be omitted. System 100 is referred to as a linear light system. Linear light systems may not work over specific dynamic ranges, such as 6-8 decades. Over these dynamic ranges, an analog-to-digital converter may be inadequate.

Figure 2:
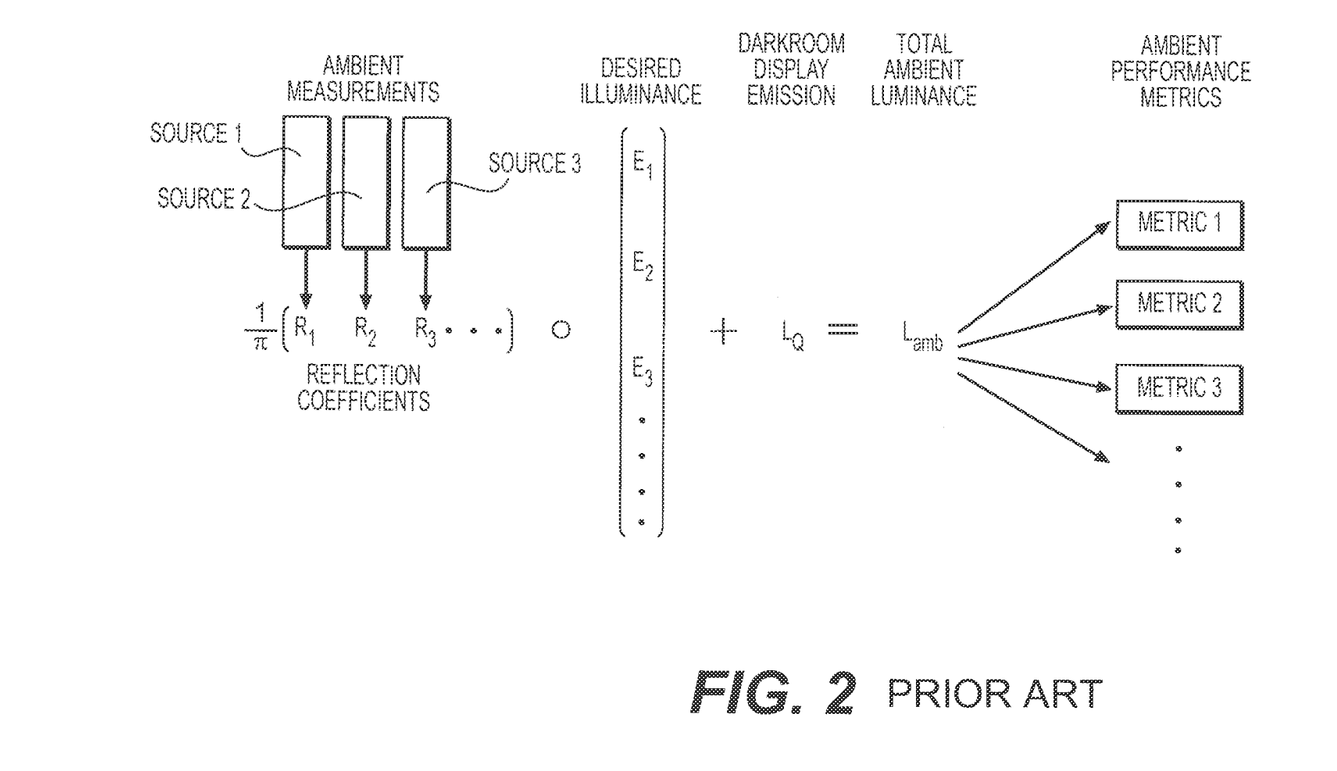
FIG. 2 illustrates an example of a process for determining ambient display background luminance (DBL).

FIG. 2 illustrates an example of a process for determining ambient display background luminance (DBL). Referring to FIG. 2, with the aspects shown, if various factors are known, such as a reflection coefficient or luminance level, the DBL may be calculated.

As shown in FIG. 2, various component reflection coefficients (R1 . . . Rn) are associated with luminance factors. These luminance factors may be employed to determine the DBL.

The aspects shown in FIG. 2, may be employed with conventional systems for ambient luminance detection. For example, in the vehicular context, the following factors may be sensed, the lambertian diffuse, specular, and haze diffuse.

Figure 3A:
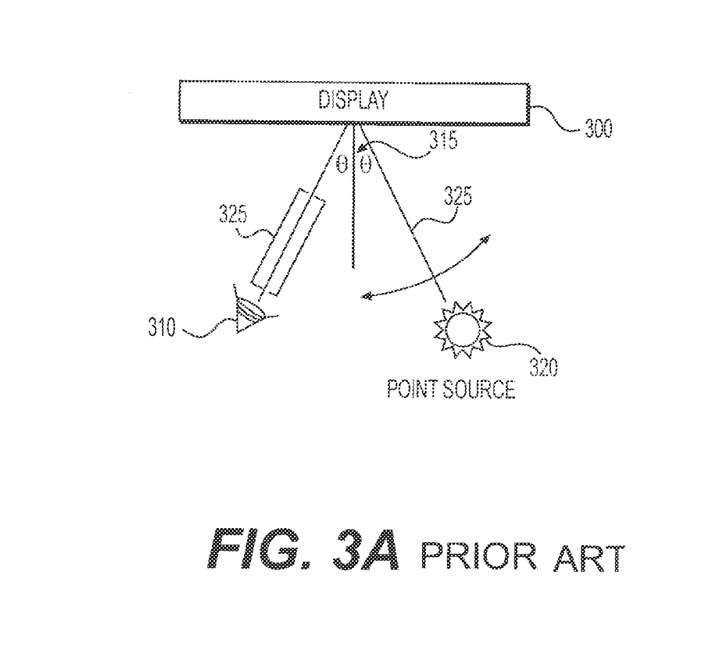
FIG. 3(a) illustrates an example of how reflection of light onto an electronic display may be measured via a light receiving source.

FIG. 3(a) illustrates an example of how reflection of light onto an electronic display 300 may be measured via a light receiving source (i.e. one eyes) 310. Referring to FIG. 3(a), a point source 320 generates light 325 onto a display 300. The display 300 reflects the light 325 onto a light receiving source 310, via an angle 315. Employing mathematical relationships known to one of ordinary skill in the art, a reflection factor β, the angle 315, a system may determine the ambient light caused by reflection off a display.

Figure 3B:
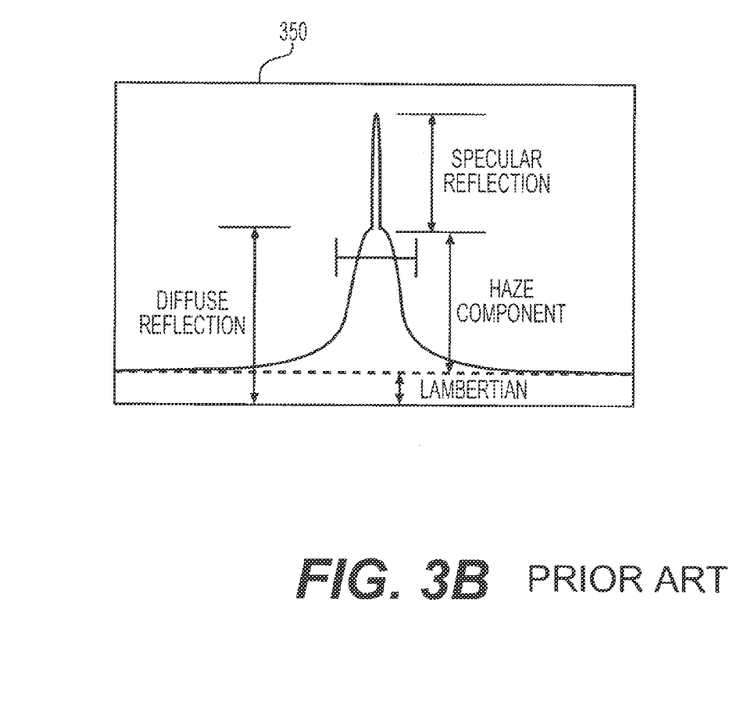
FIG. 3(b) indicates a luminance graph with source inclinations relative to a specular direction.

FIG. 3(b) indicates a luminance graph 350 with source inclinations relative to a specular direction (angle 315). The y-axis, and the ranges provided indicate an associated effect that may cause various luminance modifications at different angles.

The various affects shown in FIG. 3(b) may cause the viewer of the electronic display 300 to see various background luminance (DBL). Thus, as the DBL increases, the luminance of the display may increase at a corresponding amount to counteract the DBL effects.

In order to understand how to adjust display luminance, the Silverstein relationship is provided (as explained in several references submitted). The equation described below describes a relationship between the detect DBL and the luminance to be employed in a display.

$$ESL = B_O(DBL)^c$$

the terms being defined as:
ESL=Emitted Symbol Luminance in $cd/m^2$
$B_O$=Luminance Offset Constant
DBL=Various Display Background Luminance in $cd/m^2$
c=Power Constant (slope of the power function in logarithmic coordinates).

With cathode ray tubes (CRT) display technologies, phosphor reflectance does not change as a function of phosphor light emission. A liquid crystal display (LCD) presents a different challenge due to the "on" and "off" state each LCD cell experiences. Thus, variations of the Silverstein relationship may be calculated for LCD displays. However, by employing the DBL relationship above, the display visibility may be greatly improved.

In addition, various other factors employing the Silverstein methodology may be employed. For example, the gain correction factor (GF) may be calculated, which employs a forward looking light sensor.

However, the existing logarithmic sensors to compensate for light adaptation effects may be incompatible with the Silverstein methodology (which is designed an optimized for linear light sensing). Thus, employing a logarithmic light sensor in a display adjustment system may ultimately be frustrated.

DESCRIPTION OF THE DRAWINGS

The detailed description refers to the following drawings, in which like numerals refer to like items, and in which.

SUMMARY

A system for adjusting an electronic display is provided herein. The system includes a forward looking light sensor receiver to logarithmically receive a first light information from a forward looking light sensor; an ambient light sensor receiver to logarithmically receive a second light information from an ambient light sensor; and an adjuster to adjust a luminance of the electronic display based on a combination of the first light information and the second light information.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination of the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Electronic displays employ lighting to convey information to a viewer. As explained in the Background section, the lighting is often interfered with due to environmental conditions, such as ambient light or weather conditions. In these situations, the viewing experience may be affected by the environmental conditions, and thus, be perturbed.

Various techniques have been disclosed that allow the lighting to be adjusted. However, these techniques are either limited by the ranges or the dynamic abilities they provide.

In one such implementation, ambient light is detected, and the display is modified or adjusted accordingly. With these sensors, which may be situated on the electronic display, the light affecting the electronic display is employed to modify or adjust the display.

However, this light does not encompass all the external lighting that may be affecting a viewing on an electronic display. For example, the viewer's eye may be affected by the lighting condition experienced via external lighting sources (i.e. the sun, etc). In these situations, the solar lighting may cause the viewer's pupil to process and view the electronic display in a different manner.

As illustrated in the Background section and in other techniques, an approximation employing a linear forward looking light sensor has been proposed. This methodology does not work effectively because of the limitation in range associated with linear light sensing. The linear forward looking light sensor services a range that does not adequately cover the amount of detection necessary to successfully implement a technology to adjust the electronic display.

Disclosed herein are methods, systems, and devices for adjusting an electronic display based on light sensing. The aspects disclosed herein allow for the employment of logarithmic light sensing on a forward looking light sensor and an ambient light sensor to effectively adjust an electronic display system. The various methodologies and components discussed herein facilitate a system rendering or driving an electronic display to adjust light levels in a manner that allows for a dynamic response to environmental concerns with the implementation of a display system.

For example, if the electronic display is implemented in a vehicle, a forward looking light sensor, an ambient light sensor, and system for integrating data from both sensors may allow a viewer of the electronic display system to achieve a better and safer driving system.

The aspects disclosed herein employ a vehicle display system for explanatory purposes. However, one of ordinary skill in the art may implement the aspects disclosed herein in other contexts that employ both a forward looking light sensor and an ambient light sensor.

The forward looking light sensor and the ambient light sensor, in the implementations described below are logarithmic. The employment of a logarithmic light sensor allows for a dynamic range to be represented.

Figure 4:
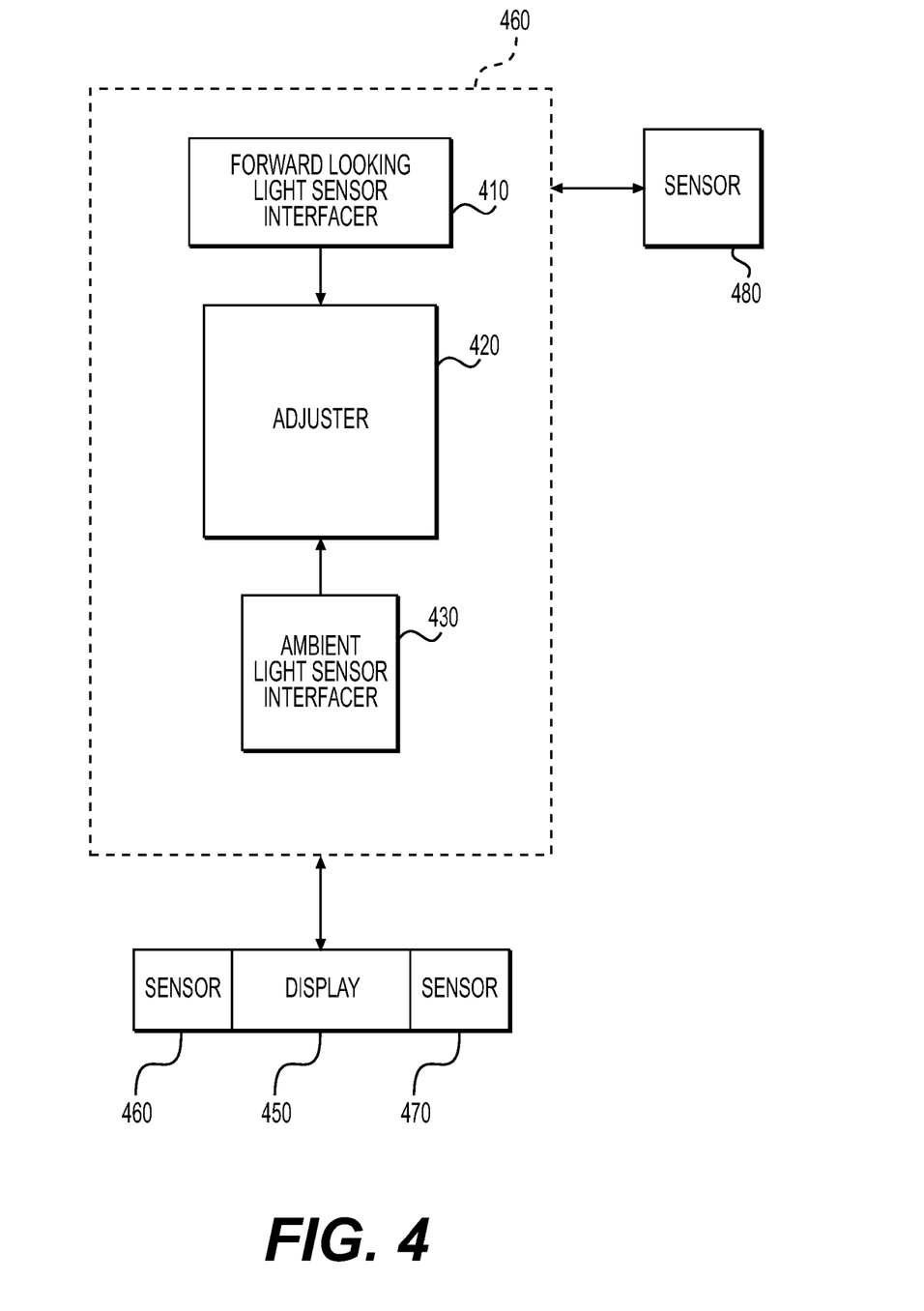
FIG. 4 illustrates an example of implementation of a system for adjusting an electronic display based on light sensing.

FIG. 4 illustrates an example of implementation of a system 400 for adjusting an electronic display 450 based on light sensing. Referring to FIG. 4, the system 400 includes a logarithmic forward looking sensor interfacer 410, an adjuster 420, and a logarithmic ambient light sensor interfacer 430. The adjuster 420 may be configured to operate on a non-transitory computer readable medium, or a processor, as described below or known by one of ordinary skill in the art.

The logarithmic forward looking sensor interfacer 410 is configured to receive data or sensing information from a logarithmic forward looking sensor 480. The sensor 480 may be installed in a fashion to replicate an image or area being viewed upon by a person viewing through a forward surface (for example, a windshield in a vehicle). For example, if the display 450 is implemented in a vehicle, the sensor 480 may be oriented to view the light coming through a windshield.

The display 450 may be any sort of electronic display attached to driving circuitry. The display 450 renders images and information via lighted elements. The amount of lighting may be configured by an adjustment and according to the aspects disclosed herein.

The display 450 may include multiple sensors, such as logarithmic ambient light sensors 460 and 470. The sensors 460 and 470 may be configured to interface with ambient light sensor interfacer 430.

The various sensors (sensor 460, 470, and 480) are each configured to monitor the light associated with the environment each one is situated in. The sensing may occur in real-time, or periodic intervals. The sensing may be configured to be enabled/disabled by user operation, or by an external signal from an electronic system in communication with the display 450.

The adjuster 420, based on the information received via the interfacers 410 and 430, adjusts the lighting associated with the display 450. The adjustment may be according to the concepts disclosed herein, and will be described in greater detail below.

Figure 5:
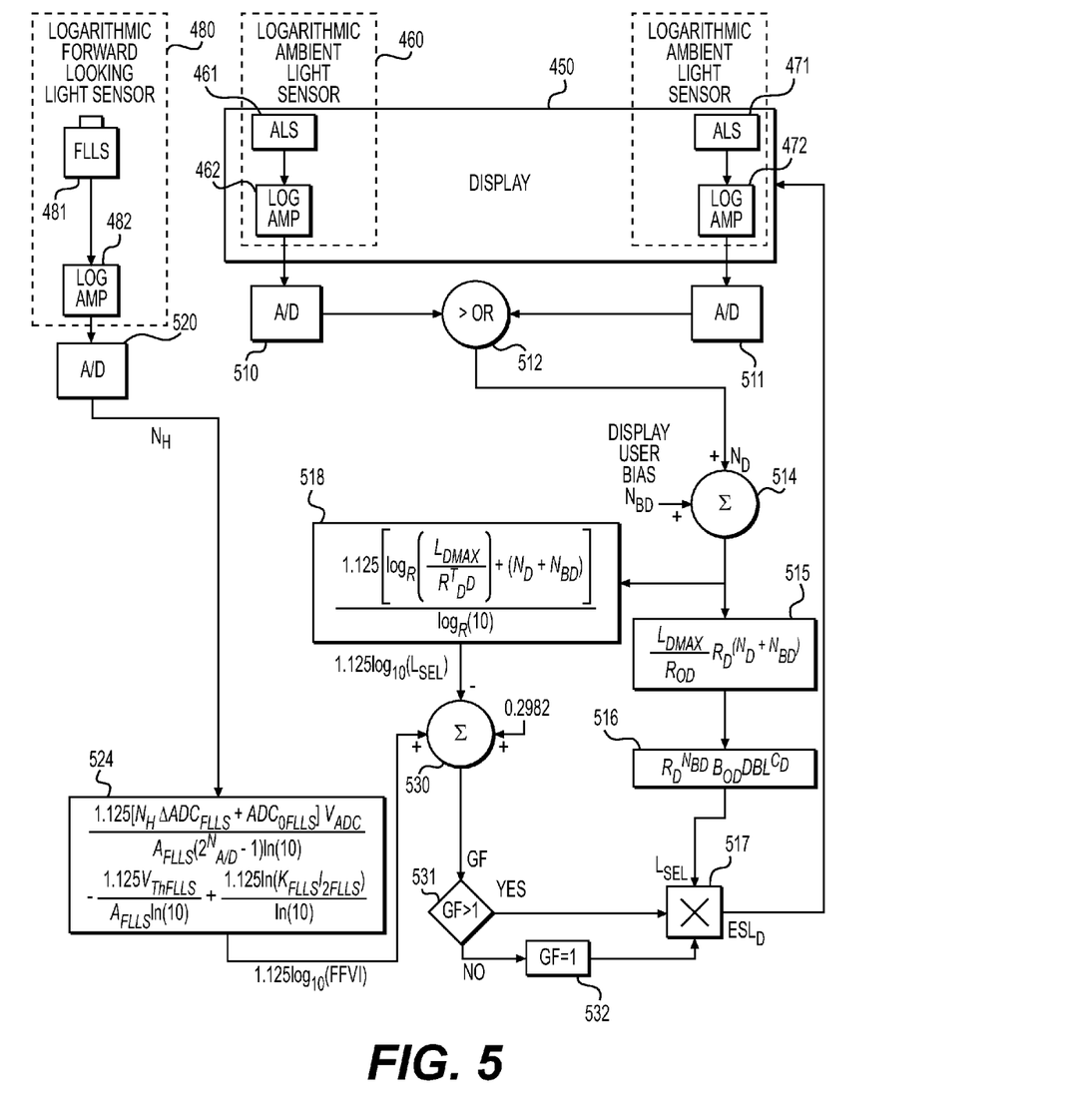
FIG. 5 illustrates an example block level diagram of an implementation of the adjuster in FIG. 4.

FIG. 5 illustrates an example block level diagram of an implementation of the adjuster 420 as shown with various sensors 460, 470, and 480. The elements employed with the block level diagram may be implemented in any sort of circuit or encoded based logic, such as those enumerated below.

Referring to FIG. 5, the sensors 460 and 470 each include an actual sensor circuit 461 and 471, as well as an amplifier 462 and 472. The voltage produced by each amplifier is output to an analog-to-digital converter (A/D), such as those shown in FIG. 5 (A/D 510 and A/D 511). The following equation may be employed to define the voltage input into A/D 510 and A/D 511:

$$V_{OALS} = A_V V_T \ln\left(\frac{i_{ALS}}{I_{2ALS}}\right) + V_{ThALS}$$

The digital conversion is represented by the following equation:

$$ADC_{ALS} = \frac{(2^{N_{A/DALS}} - 1)}{V_{ADCALS}}\left[A_V V_T \ln\left(\frac{i_{ALS}}{I_{2ALS}}\right) + V_{ThALS}\right]$$

The above-identified equations (the terms, definition of the constants, and the derivation) are found in references submitted along with this application, and thus, a full explanation is omitted for brevity.

The output of the A/D blocks may be employed to drive the adjuster 420 (and thus, adjust the lighting of the display 450). However, the values may be employed as described below to adjust the display 450 in another way.

The following relationship describes the $L_{sel}$ value. The $L_{sel}$ value is the desired display luminance, and may be determined by populating a lookup table based on various constant step ratios R. If the constant step ratio is used, $N_D$ value, and the $N_{DB}$ value may employed to determine the Lsel value. $N_D$ is used and derived by the A/D output, and $N_{DB}$ may be obtained by a user offset or bias. This definition is described in the references disclosed, and is listed as:

$$L_{SEL} = \frac{L_{Max}}{R_D^{T_D}} R^{(N_D + N_{BD})}$$

The logarithmic expression of the above-described relationship is defined by the following:

$$\log_R(L_{SEL}) = \log_R\left(\frac{L_{Max}}{R_D^{T_D}}\right) + (N_D + N_{BD})$$

For the ease of analysis, the base 10 version of the above relationship may be calculated by the following expressions:

$$\log_b(x) = \frac{\log_d(x)}{\log_d(b)}$$

$$\log_{10}(L_{SEL}) = \frac{\log_R\left(\frac{L_{Max}}{R_D^{T_D}}\right) + (N_D + N_{BD})}{\log_R(10)}$$

For each $L_{sel}$ calculated, a lookup table may be referred to find a corresponding constant figure. For the purposes of the adjuster 420 shown above, the constants are known as ($N_D$).

It will be described further below how the above described relationship is incorporated by the analysis performed by the data obtained from sensors 460, 470, and 480.

Specifically, for the sensor 480, the following relationships described below produce a value that may be employed to augment the adjustment described herein. Sensor 480 may include circuits 481 and 482 similar to circuits 461 and 462, respectively.

The sensor 480 produces a voltage, which may be defined by the following relationships:

$$A_{FLLS} = A_{VFLLS} V_{TFLLS}$$

$$V_{OFLLS} = A_{VFLLS} \ln\left(\frac{i_{FLLS}}{I_{2FLLS}}\right) + V_{ThFLLS}$$

The voltage generated above in the previous equation may undergo an A/D conversion, with the following relationship (as shown by element 520):

$$ADC_{FLLS} = \frac{(2^{N_{A/D}} - 1)}{V_{ADC}}\left[A_{FLLS} \ln\left(\frac{i_{FLLS}}{I_{2FLLS}}\right) + V_{ThFLLS}\right]$$

The equation may be transformed even more by the following:

$$FFVI = K_{FLLS} i_{FLLS}$$

Where $K_{FFLS}$ is a constant, thereby rendering the following relationship for the A/D conversion:

$$ADC_{FLLS} = \frac{(2^{N_{A/D}} - 1)}{V_{ADC}}\left[A_{FLLS} \ln\left(\frac{FFVI}{K_{FLLS} I_{2FLLS}}\right) + V_{ThFLLS}\right]$$

Manipulating the relationship produces the following:

$$\ln(FFVI) = \frac{ADC_{FLLS} V_{ADC} - (2^{N_{A/D}} - 1)V_{ThFLLS}}{(2^{N_{A/D}} - 1)A_{FLLS}} + \ln(K_{FLLS} I_{2FLLS})$$

Taking a logarithm of the relationship produces:

$$\log_{10}(FFVI) = \frac{ADC_{FLLS}V_{ADC} - (2^{N_{A/D}} - 1)V_{ThFLLS}}{(2^{N_{A/D}} - 1)A_{FLLS}\ln(10)} + \frac{\ln(K_{FLLS}I_{2FLLS})}{\ln(10)}$$

In order to manipulate the equation further, a $N_H$ factor may be employed. The $N_H$ factor may be determined by the A/D count above, and defined the following relationship:

$$N_H = \frac{ADC_{FLLS} - ADC_{0FLLS}}{\Delta ADC_{FFLS}}$$

Which may be substituted in the previous relationship, producing the following:

$$\log_{10}(FFVI) =$$
$$\frac{[N_{FLLS}\Delta ADC_{FLLS} + ADC_{0FLLS}]V_{ADC}}{(2^{N_{A/D}} - 1)A_{FLLS}\ln(10)} - \frac{V_{ThFLLS}}{A_{FLLS}\ln(10)} + \frac{\ln(K_{FLLS}I_{2FLLS})}{\ln(10)}$$

The above relationship is multiplied by 1.125 to produces the relationship shown in element 524:

$$1.125\log_{10}(FFVI) = \frac{1.125[N_{FLLS}\Delta ADC_{FLLS} + ADC_{0FLLS}]V_{ADC}}{A_{FLLS}(2^{N_{A/D}} - 1)\ln(10)} -$$
$$\frac{1.125V_{ThFLLS}}{A_{FLLS}\ln(10)} + \frac{1.125\ln(K_{FLLS}I_{2FLLS})}{\ln(10)}$$

The above relationship produces a 1.125 $\log_{10}$(FFVI) factor that is input into element 530.

Element 530 sums the contribution from the various sensors (460-480), to produce the following relationship to produce a gain factor (GF):

$$GF = 1.125\log\left(\frac{FFVI}{WSI}\right) + 0.2982$$
$$= 1.125\log_{10}\left(\frac{FFVI}{L_{SEL}}\right) + 0.2982$$
$$= 1.125\log_{10}(FFVI) - 1.125\log_{10}(L_{SEL}) + 0.2982$$

The above relationship indicates another advantage of employing logarithmic sensors since only addition and subtraction is employed in element 530. The method to perform the gain factor (GF) multiplication by element 517 may be performed by a processor. However a less computationally intense method is to construct a lookup table.

In element 531, a branching statement is employed to determine whether the GF is above a certain threshold (for example, 1). If the GF (as calculated by element 530) is greater than 1, the adjuster 420 proceeds to element 517. If the GF is greater than 1, then the $L_{SEL}$ value determined by sensors 460 and 470 is multiplied by the GF in element 517.

The output of 517 is fed back to the display 450, and the display 450 is adjusted accordingly by the multiplied value.

If no (in element 531), the GF is set to 1, and adjuster 420 proceeds to element 517. In this situation, the display 450 is not adjusted. In one example, the GF multiplication performed in element 517 may be performed by a processor. However, in another example, a lookup table might be employed.

In order to determine a constant to employ with a lookup table, the following set of equations may be incorporated with the adjuster 420. Element 514 is a summation block that produces an $N_d + N_{bd}$ value. That value is employed to calculate the value produced in element 518. It may be additionally propagated to element 515 to satisfy the following relationship:

$$L_{SEL} = \frac{L_{Max}}{\left[\frac{L_{Max}}{L_{Min}}\right]^{\left(\frac{T-N_S}{T-1}\right)}}$$

Where $N_S$ is the $N_d + N_{bd}$ value.

Figure 6:
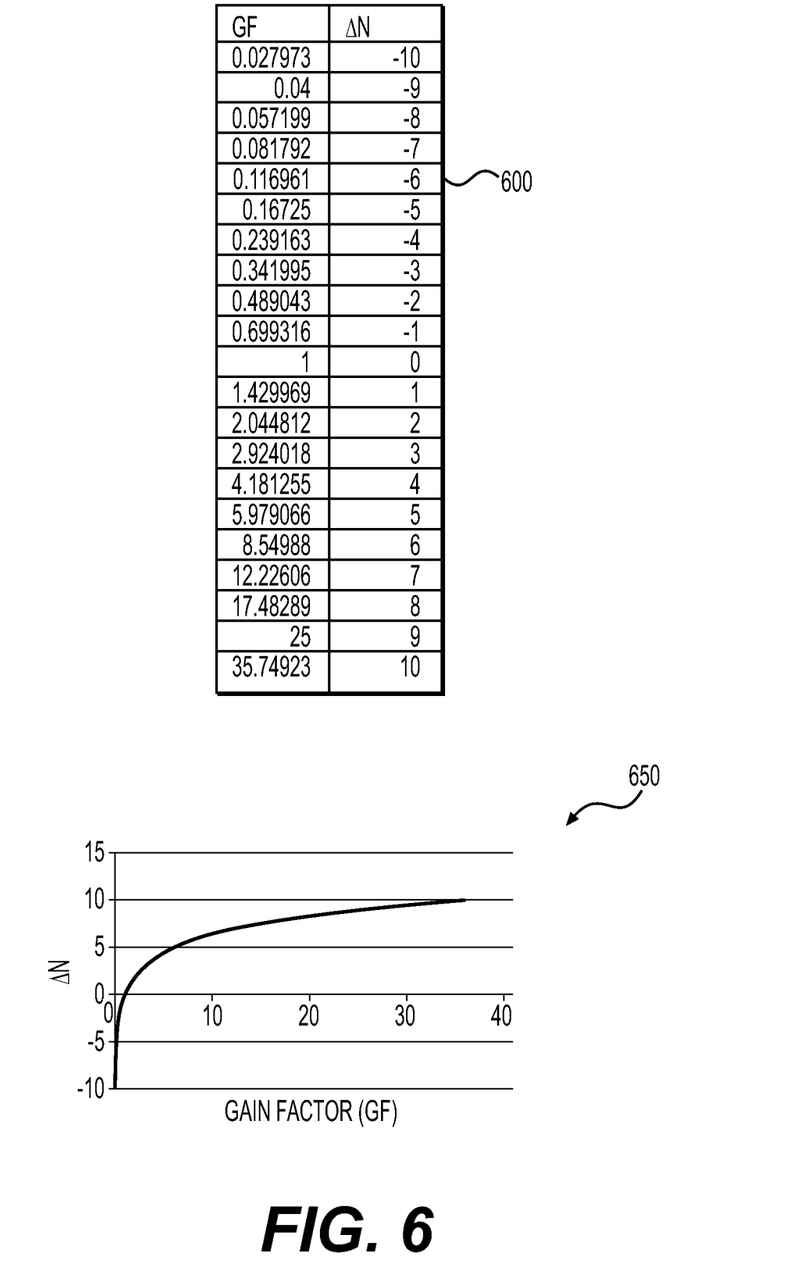
FIG. 6 illustrates an example of a lookup table to be employable with system in FIG. 7.

In order to determine a step number (which is then cross-referenced to a lookup table 600, as shown in FIG. 6), the following series of equations are employed:

$$L_{GF} = \frac{L_{Max}}{\left[\frac{L_{Max}}{L_{Min}}\right]^{\left(\frac{T-N_{GF}}{T-1}\right)}}$$

The above equations are combined to determine the following:

$$GF = \frac{\left[\frac{L_{Max}}{\left[\frac{L_{Max}}{L_{Min}}\right]^{\left(\frac{T-N_{GF}}{T-1}\right)}}\right]}{\left[\frac{L_{Max}}{\left[\frac{L_{Max}}{L_{Min}}\right]^{\left(\frac{T-N_S}{T-1}\right)}}\right]}$$

The above equation may be simplified, therefore producing the following:

$$GF = \frac{\left[\frac{L_{Max}}{L_{Min}}\right]^{\left(\frac{T-N_S}{T-1}\right)}}{\left[\frac{L_{Max}}{L_{Min}}\right]^{\left(\frac{T-N_{GF}}{T-1}\right)}}$$

Further manipulation of the above equation produces:

$$GF = \left[\frac{L_{Max}}{L_{Min}}\right]^{\left[\left(\frac{T-N_S}{T-1}\right) - \left(\frac{T-N_{GF}}{T-1}\right)\right]}$$

Subtraction of the exponent terms results in:

$$GF = \left[\frac{L_{Max}}{L_{Min}}\right]^{\left[\frac{N_{GF}-N_S}{T-1}\right]}$$

Producing the natural log, provides the following:

$$\ln(GF) = (N_{GF} - N_S)\ln\left(\left[\frac{L_{Max}}{L_{Min}}\right]^{\left(\frac{1}{T-1}\right)}\right)$$

A luminance ratio, $R_D$, describing the display luminance ratio for each N step may be defined by the following:

$$R_D = \left[\frac{L_{Max}}{L_{Min}}\right]^{\left(\frac{1}{T-1}\right)}$$

Substituting the equations above, produces:

$$(N_{GF} - N_S) = \Delta N = \frac{\ln(GF)}{\ln(R_D)}$$

The previous equations indicate that the step level of the sensors 460 and 470 are not important, and that the difference $\Delta N=(N_{GF}-N_S)$ needs to be added.

Figure 7:
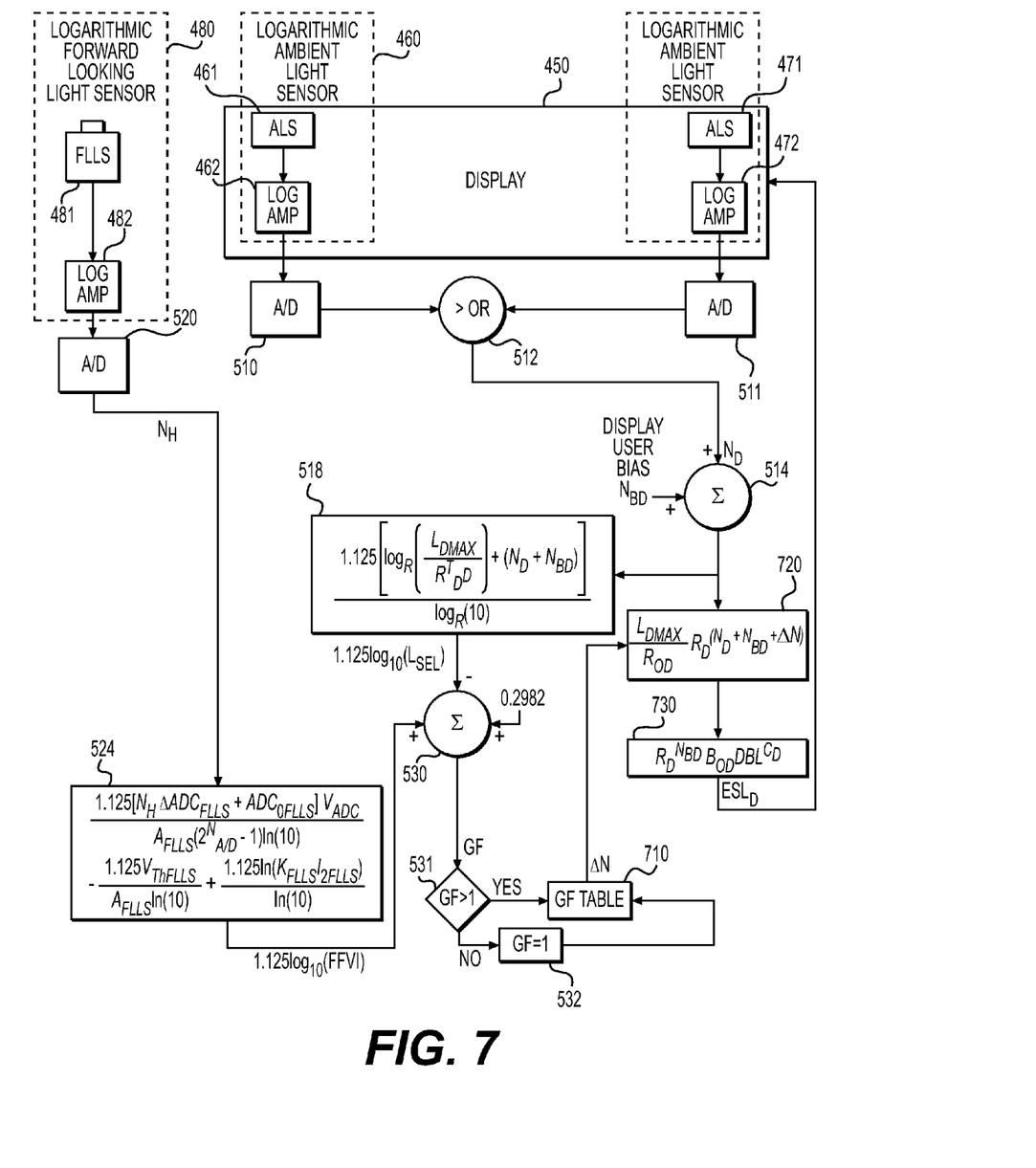
FIG. 7 illustrates an example of adjuster according to another exemplary embodiment.

This relationship is shown in greater detail in FIG. 7. FIG. 7 illustrates an example of adjuster 420 according to another exemplary embodiment. A key difference between the adjuster 420 shown in FIG. 5 and FIG. 7 is that the element 517 is obviated (thereby avoiding processing power or hardware componentry necessary to implement element 517). In its place is the GF table 710, which correlates a calculated GF with a $\Delta N$ (for example, via lookup table 600). The $\Delta N$ is then inputted into element 720 (which is similar to element 515, but incorporates a term for $\Delta N$). The GF employed for display adjustment may be calculated in 730.

Another difference is that element 524 is different in FIG. 7 than FIG. 5. As shown in the figure, the expression is different to counter the different derivation due to the lookup table being employed.

FIG. 6 illustrates an example of a lookup table 600 to be employable with system 400. Lookup table 600 is exemplary, and the values and correlations between the GF and the $\Delta N$ factor may be modified based on the display specifications implemented. Also shown in FIG. 6, is a graph 650 that shows a relationship between $\Delta N$ and the GF.

Figure 8:
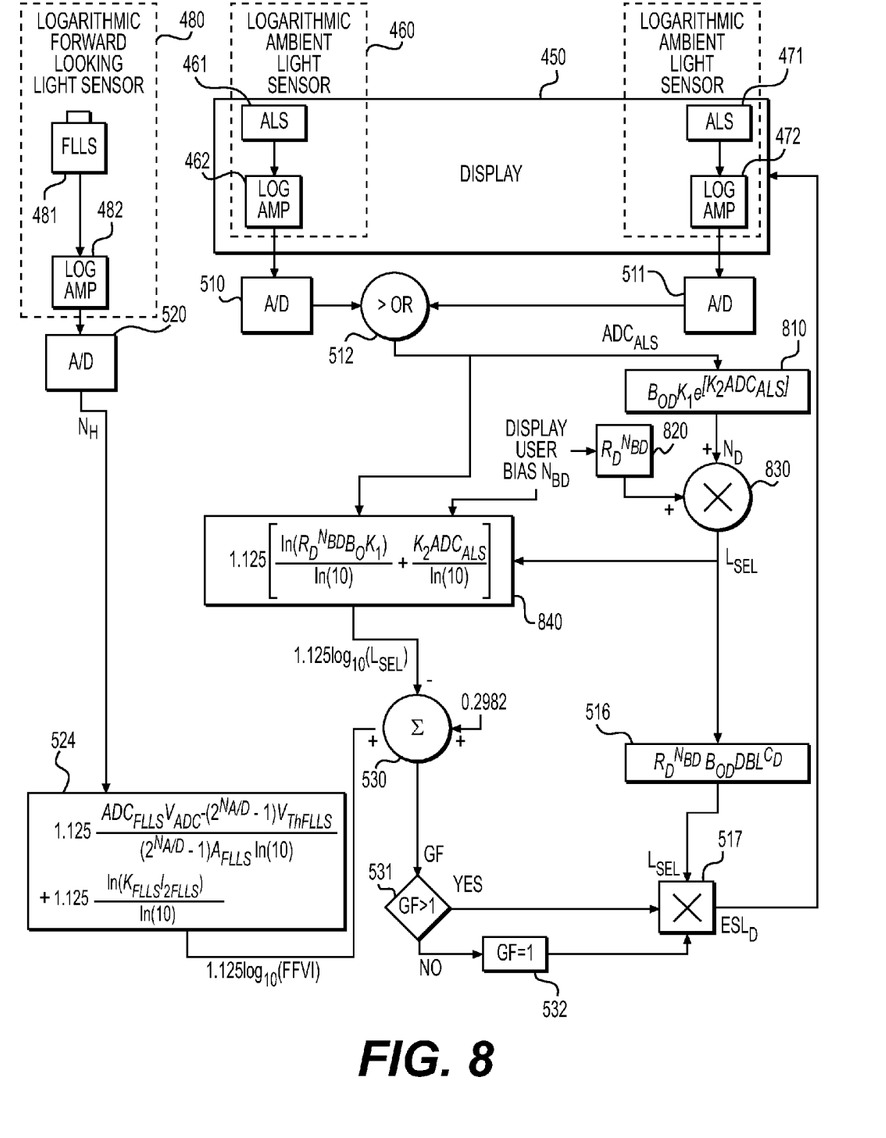
FIG. 8 illustrates example of adjuster according to another exemplary embodiment.

FIG. 8 illustrates another example implementation of adjuster 420. The implementation in FIG. 8 is similar to the one shown in FIG. 5; however, various of the elements are changed, as shown in FIG. 8 and in the series of mathematical expressions explained below. The example shown in FIG. 8 employs mathematical calculations, and obviates the need for any lookup tables, such as lookup table 600.

Instead of relying on an index number $N_D$, elements 810, 820, and 830 are introduced. Also, elements 518 and 524 are changed to eliminate the table index parameters $N_H$ and $N_D$. The following set of expressions and formulas explain how the index numbers are replaced.

The display ambient light sensor output is calculated in a similar way as describe in FIG. 5.

$$A_V V_T \ln\left(\frac{i_{ALS}}{I_{2ALS}}\right) = \frac{ADC_{ALS} V_{ADCALS}}{(2^{N_{A/DALS}} - 1)} - V_{ThALS}$$

The above equation is then transformed to produce the following.

$$\ln\left(\frac{i_{ALS}}{I_{2ALS}}\right) = \frac{ADC_{ALS} V_{ADCALS}}{A_V V_T (2^{N_{A/DALS}} - 1)} - \frac{V_{ThALS}}{A_V V_T}$$

Which leads to the following derivation:

$$\ln(i_{ALS}) - \ln(I_{2ALS}) = \frac{ADC_{ALS} V_{ADCALS}}{A_V V_T (2^{N_{A/DALS}} - 1)} - \frac{V_{ThALS}}{A_V V_T}$$

$$\ln(i_{ALS}) = \frac{ADC_{ALS} V_{ADCALS}}{A_V V_T (2^{N_{A/DALS}} - 1)} - \frac{V_{ThALS}}{A_V V_T} + \ln(I_{2ALS})$$

Allowing for the solving of $i_{ALS}$:

$$i_{ALS} = I_{2ALS} e^{\left[\frac{ADC_{ALS} V_{ADCALS}}{A_V V_T (2^{N_{A/DALS}} - 1)}\right]} e^{\left[-\frac{V_{ThALS}}{A_V V_T}\right]}$$

The relationship between the Display Background Luminance (DBL) and the photocurrent $i_{ALS}$ is defined by the following where B is reflectance factor based on viewer geometry:

$$i_{ALS} = \frac{\pi}{\beta K_P} DBL$$

Solving for DBL provides the following:

$$DBL = \frac{\beta K_P}{\pi} i_{ALS}$$

After which, ESL may be solved for (block 810):

$$ESL = B_{OD}(DBL)^C$$

$$ESL = B_{OD}\left(\frac{\beta K_P}{\pi}\right)^C (i_{ALS})^C$$

$$ESL = B_{OD}\left(\frac{\beta K_P}{\pi}\right)^C \left(I_{2ALS} e^{\left[\frac{ADC_{ALS} V_{ADCALS}}{A_V V_T (2^{N_{A/DALS}} - 1)}\right]} e^{\left[-\frac{V_{ThALS}}{A_V V_T}\right]}\right)^C$$

$$ESL = B_{OD}\left(\frac{\beta K_P I_{2ALS}}{\pi} e^{\left[-\frac{V_{ThALS}}{A_V V_T}\right]}\right)^C e^{\left[\frac{C \cdot ADC_{ALS} V_{ADCALS}}{A_V V_T (2^{N_{A/DALS}} - 1)}\right]}$$

In element 830, the amount calculated by element 810 is multiplied by $R_D(N_{BD})$—corresponding to the user bias. This figure may be referred to as $L_{SEL}$, and may undergo another transformation in element 850.

$$L_{SEL} = R_D^{N_{BD}} B_{OD}\left(\frac{\beta K_P I_{2ALS}}{\pi} e^{\left[-\frac{V_{ThALS}}{A_V V_T}\right]}\right)^C e^{\left[\frac{C \cdot ADC_{ALS} V_{ADCALS}}{A_V V_T (2^{N_{A/DALS}} - 1)}\right]}$$

In the expression above, the last term requires an exponential term to be determined. If constants $K_1$ and $K_2$ are defined, element 830 may be simplified as below:

$$L_{SEL} = R_D^{N_{BD}} B_{OD} K_1 e^{[K_2 ADC_{ALS}]}$$

Element 518, which is employed to calculate the gain factor is also modified as below (to element 840).

$$\ln(L_{SEL}) = \ln(R_D^{N_{BD}} B_{OD} K_1) + K_2 ADC_{ALS}$$

$$1.125 \log_{10}(L_{SEL}) = 1.125 \frac{\ln(R_D^{N_{BD}} B_{OD} K_1)}{\ln(10)} + 1.125 \frac{K_2 ADC_{ALS}}{\ln(10)}$$

$$1.125 \log_{10}(L_{SEL}) =$$
$$1.125 \frac{N_{BD} \ln(R_D)}{\ln(10)} + 1.125 \frac{\ln(B_{OD} K_1)}{\ln(10)} + 1.125 \frac{K_2 ADC_{ALS}}{\ln(10)}$$

Once the output of element 518 is produced (and propagated to element 840), the gain factor and the subsequent modifications to the luminance may be performed in a similar fashion as that shown in FIG. 5.

Figure 9:
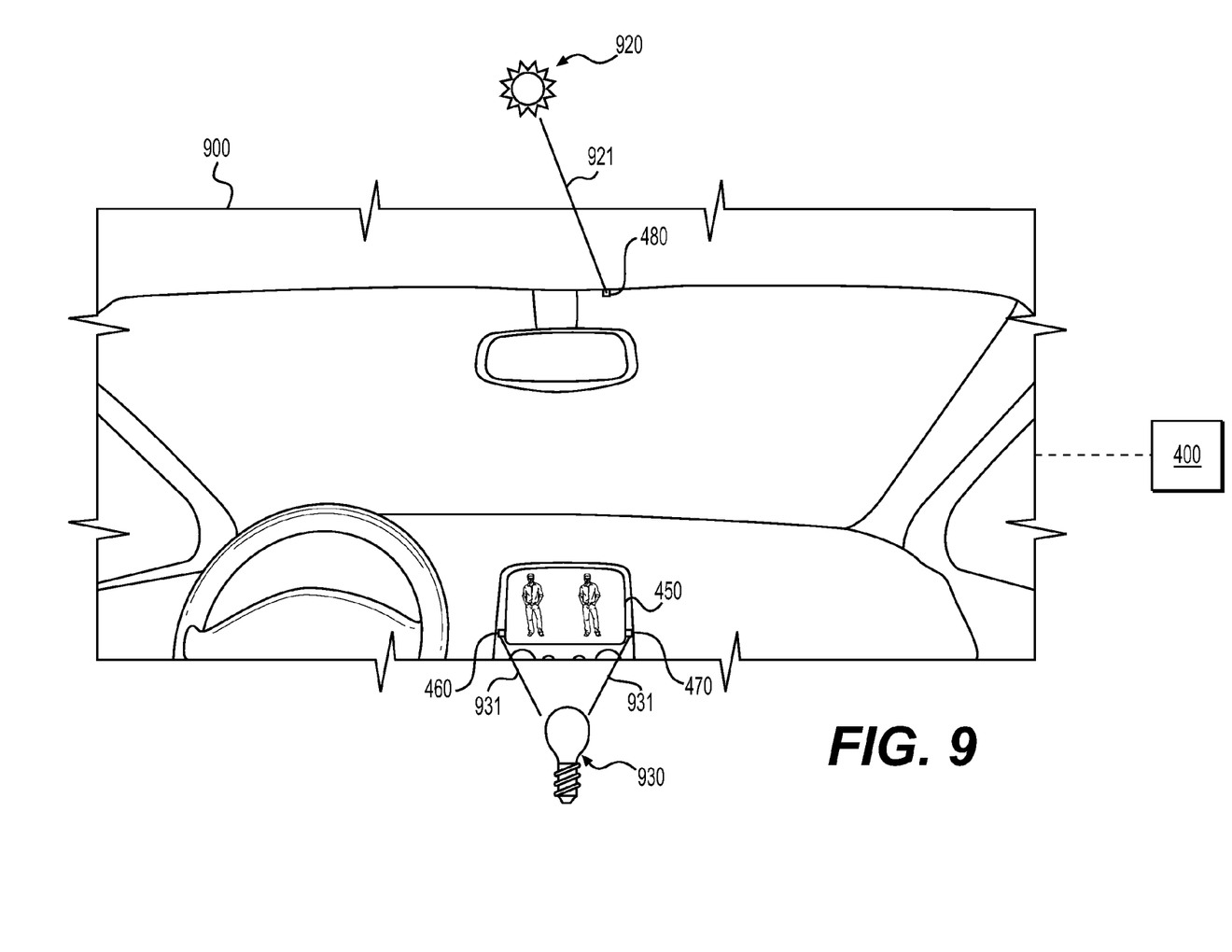
FIG. 9 illustrates an example of a vehicle implementing a system shown in FIG. 4.

FIG. 9 illustrates an example of a vehicle 900 implementing a system 400 as described herein. The system 400 may employ any of the adjuster 420 embodiments disclosed herein.

Specifically, a view of the vehicle from a driver/passenger looking outside of a front window is depicted. The other elements of the vehicle are not shown or described for exemplary purposes. The vehicle includes a display 450, which may be any electronic display 450 know one of ordinary skill in the art. Display 450's luminance may be adjustable by the various parameters described herein.

As shown in FIG. 9, a light source 920 and 930 are shown. The light source 920 may emanate from outside of the vehicle, and be sourced from either a street light or a naturally occurring phenomena, such as the sun. The light source 920 produces a light ray 921. Light ray 921 may be representative of a light that a driver/passenger sees while looking outside the windshield 910.

Light source 930 represents the light being emanated from within the vehicle, such as an ambient light source. Light source 930 produces a light ray 931. Light ray 931 may be representative of a light being shone onto a display 450's screen. A light bulb is shown to graphically represent this light, however, the light may be produced for all sorts of light effects that propagate onto a display 450. For example, the light may come from external sources (i.e. the sun or moon), light from multiple light sources, or the like.

The system 400 employs the techniques described up above to sense the light rays 921 and 931, and subsequently alter the display 450. By employing two sets of logarithmic light sensors, the display 450 may adjust to various light conditions in a robust and dynamic manner.

FIG. 9 illustrates an example where system 400 is implemented in a vehicle. However, one of ordinary skill in the art may implement system 400 in any sort of environment where a display 450 is situated at.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A system for adjusting an electronic display, comprising:
    a forward looking light sensor receiver to logarithmically receive a first light information from a forward looking light sensor;
    an ambient light sensor receiver to logarithmically receive a second light information from an ambient light sensor; and
    an adjuster to adjust a luminance of the electronic display based on a combination of the first light information and the second light information, and
    the adjuster is further configured to perform the combination by summing the first light information and the second light information in log form, to produce an output, and the output is employed with a gain factor table to produce the adjustment of the luminance.

2. The system according to claim 1, wherein the first information and the second information are respectively transformed via an analog-to-digital (A/D) process.

3. The system according to claim 2, wherein the first information, after undergoing the A/D process, is combined with a display user bias to produce an output.

4. The system according to claim 3 wherein the output is combined with a transformed version of the second information to produce a gain factor.

5. The system according to claim 4, wherein the gain factor is employed to perform the adjustment of the electronic display.

6. The system according to claim 5, wherein the gain factor is multiplied by a primary gain factor, the primary gain factor being generated independent from the second information, and the multiplied product being employed to adjust the electronic display.

7. The system according to claim 5, wherein the gain factor is correlated with a constant via a predefined lookup table, and the correlated constant is employed to produce a new gain factor to adjust the electronic display.

8. The system according to claim 2, wherein the transformed first information is converted to an index number.

9. The system according to claim 2, wherein a defined expression is summed with the first information and transformed second information to produce a value, the value being employed to determine a gain factor.

* * * * *